United States Patent [19]

De Young et al.

[11] Patent Number: 5,521,760

[45] Date of Patent: May 28, 1996

[54] ENERGY ABSORBING REARVIEW MIRROR ASSEMBLY

[75] Inventors: Harold W. De Young; Raj K. Agrawal; Roger L. Veldman, all of Holland, Mich.

[73] Assignee: Donnelly Corporation, Holland, Mich.

[21] Appl. No.: 273,491

[22] Filed: Jul. 11, 1994

[51] Int. Cl.⁶ .......................... G02B 27/00; G02B 5/08; B60Q 1/00
[52] U.S. Cl. .................. 359/601; 359/604; 359/606; 359/848; 362/83.1; 248/467
[58] Field of Search .................. 359/601–602, 359/603, 604; 376/320; 358/848

[56] References Cited

U.S. PATENT DOCUMENTS

| | | | |
|---|---|---|---|
| 1,434,860 | 11/1922 | Taylor . | |
| 1,488,923 | 4/1924 | Hitchcock . | |
| 1,603,951 | 10/1926 | Hitchcock . | |
| 1,653,053 | 12/1927 | Lyndon . | |
| 2,352,923 | 7/1944 | Turner | 88/105 |
| 3,391,895 | 7/1968 | Bausch et al. | 248/467 |
| 3,427,095 | 2/1969 | Dykema et al. | 350/288 |
| 3,489,484 | 1/1970 | Brown | 350/310 |
| 3,607,584 | 9/1971 | Becht | 161/4 |
| 3,708,218 | 1/1973 | Smillie, III | 350/61 |
| 3,776,618 | 12/1973 | Perison, Sr. | 350/288 |
| 3,856,384 | 12/1974 | Kryzhanovsky | 350/310 |
| 3,985,429 | 10/1976 | Fleischer | 350/288 |
| 4,648,164 | 3/1987 | Hyodo et al. | 29/894.1 |
| 4,663,115 | 5/1987 | Russell | 376/320 |
| 5,115,346 | 5/1992 | Lynam | 359/604 |
| 5,151,824 | 9/1992 | O'Farrell | 359/604 |
| 5,178,448 | 1/1993 | Adams et al. | 362/83.1 |
| 5,179,471 | 1/1993 | Caskey et al. | 359/603 |
| 5,283,696 | 2/1994 | Lanser et al. | 359/870 |
| 5,327,288 | 7/1994 | Wellington et al. | 359/603 |

FOREIGN PATENT DOCUMENTS

| | | |
|---|---|---|
| 809433 | of 1937 | France . |
| 852209 | of 1940 | France . |
| 1108523 | 4/1968 | United Kingdom . |

OTHER PUBLICATIONS

Ford Engineering Material Specification ESB–M64J19–A1, 1983.

*Primary Examiner*—Paul M. Dzierzynski
*Assistant Examiner*—Mohammad Y. Sikder
*Attorney, Agent, or Firm*—Van Dyke, Gardner, Linn & Burkhart

[57] ABSTRACT

A safety-enhanced, inside rearview mirror assembly for vehicles of the type adapted for movement between day and night positions to reduce reflected glare is disclosed. The assembly includes an energy/impact absorbing plate selected to have predetermined thickness, stiffness, cracking/permanent deformation resistance, and galvanic action passivity positioned between the glass mirror element and the day/night actuator within the mirror case. The plate absorbs the actuator impact energy should the day/night actuator be caused to impact the rear of the glass mirror element when the front of the inside rearview mirror assembly is contacted by an air bag during deployment in an accident and substantially reduces damaging protrusion of glass shards which otherwise could puncture and impair proper operation of the air bag. The plate may be spaced from the rear of the mirror element, or adhered to the mirror element preferably with a flexible, resilient adhesive laminate which doubles as an anti-scatter layer. The plate avoids significant affects on the weight, vibration, and mirror case construction without degrading the light reflective layer.

49 Claims, 2 Drawing Sheets

ENERGY ABSORBING REARVIEW MIRROR ASSEMBLY

FIELD OF THE INVENTION

This invention relates to safety-enhanced inside rearview mirror assemblies for vehicles and, more particularly, to a day/night glare reducing inside rearview mirror assembly incorporating a glass mirror element and adapted to prevent damage to and improper operation of supplemental occupant restraint systems in vehicles, commonly known as air bags.

BACKGROUND OF THE INVENTION

Conventional inside rearview mirrors, including rearview mirrors incorporating pivotable actuator mechanisms for moving the rearview mirror case and mirror element between a high reflectivity day position and a low reflectivity night position, use glass mirror elements incorporating scatter proofing materials to reduce glass scattering upon breakage. Typically, such inside rearview mirrors are mounted on the interior of the vehicle driver/passenger compartment at or near the upper edge of the front windshield. During accidents, the driver and/or other passengers can be thrown forwardly toward the windshield, striking the rearview mirror, causing its fracture and dispersement of dangerous glass fragments and shards. To overcome such danger, scatter-preventing layers have been incorporated on the rear of the glass mirror elements in such assemblies, such layers being selected from adhesive tape, various adhesive layers, layers of plastisol, reinforcing layers such as woven fabric or fiberglass mats, and even sheet metal plates adhered to the rear surface of the mirror element with rubber or silicone adhesives. See, for example, the reinforced mirror elements in U.S. Pat. Nos. 3,985,429 and 3,391,895.

However, the prior known safety inside rearview mirrors have failed to accommodate a more recent safety hazard in vehicles equipped with supplemental occupant restraint systems, commonly known as air bags. In such vehicles, and especially those including two air bags, one mounted in the steering wheel post for protection of the driver, and another on the instrument panel area adjacent or aligned with the front passenger seat, sudden deceleration of the vehicle causes deployment of such air bags by rapid expansion in the period of a few milliseconds. The passenger side air bag is typically large enough to protect two occupants, one in the conventional passenger seat adjacent the door and another seated in the center of the front seat. When deployed, such larger, passenger side air bags expand rapidly outwardly away from the instrument panel as well as laterally and then toward the windshield and instrument panel to complete their expansion. Since the inside rearview mirror is typically positioned near the top edge of the center of the windshield but several inches inwardly therefrom on a support arm, such deployment also envelopes and contacts substantially the entire length of the rearview mirror assembly. Such contact is uniform across the viewing surface of the mirror and traps the rearview mirror preventing it from tipping one way or the other. In such position, the mirror is impacted straight back against its support arm which extends outwardly from the windshield creating a sustained, column loading. Such loading forces the mirror element violently toward the day/night actuator mechanism within the mirror case causing it to be thrust forwardly out of its normal supports and against the rear side of the glass mirror element. This results in fracturing of the glass mirror with portions of the glass forced outwardly beyond the mirror case edges in the form of sharp-edged glass shards. If a passenger within the vehicle simultaneously strikes the inner facing surface of the air bag thereby forcing it toward tile windshield, the sustained load on the inside rearview mirror assembly causing the above fracturing action of the day/night actuator is accentuated. The protrusion of the glass shards may impair proper operation by causing puncturing and ultimate failure of the air bag at the critical moment when deployment and resistance to impact is most needed to protect the vehicle occupants.

Accordingly, vehicular air bag systems have generated a new problem which day/night actuated inside rearview mirror assemblies incorporating glass or other fracturable mirror elements must resist, i.e., the avoidance of mirror element fracture and protrusion of shards or pieces which otherwise would puncture and impair proper operation of air bags during air bag deployment. The present invention was conceived as a solution for this problem in such inside rearview mirror assemblies.

SUMMARY OF THE INVENTION

Accordingly, the present invention provides a safety-enhanced, inside, rearview mirror assembly adapted to overcome the problem of sharp, protruding pieces of a glass or other fracturable mirror element if fractured upon deployment of supplemental occupant restraint system air bags within vehicles. The assembly absorbs or disperses the energy of impact of the day/night mirror actuator against the back of the mirror element and substantially reduces damage to the air bag which could impair its proper operation. Such energy absorption/dispersion is accomplished by the use of a safety-enhancing plate which obstructs the motion of the actuator caused by contact between the mirror assembly and the air bag during deployment, while avoiding significant effects on the weight, vibration, and construction of the mirror case assembly, all without degradation of the reflective layer in the mirror assembly.

In one form, the invention is an energy absorbing, inside rearview mirror assembly including a mirror case, a mirror element mounted within the case, being of the type which is fracturable upon impact, and having front and rear surfaces, a light reflective layer on the rear surface of the mirror element, a day/night actuator mounted for movement in the mirror case behind the rear surface of the mirror element and movable to change the mirror element between a day position in which light is reflected from the reflective layer to a viewer and a night position in which a reduced amount of light is reflected from the front surface of the mirror to a viewer as well as a support arm mounted on the actuator to support the assembly on the vehicle. An energy absorbing plate within the mirror is positioned within the mirror case between the actuator and the surface of the mirror element. The plate has a sufficient thickness, stiffness, and resistance to cracking and permanent deformation to absorb and disperse energy and substantially reduce protrusion of glass shards past the mirror case rim in the event of a fracturing impact from the direction of the front surface of the mirror element such as by an air bag during deployment.

Preferably, the energy absorbing plate may be selected from polymeric plastics or metals and has a thickness within the range of between about 0.015 and 0.250 inch, an elastic modulus of at least about 250,000 psi, and a resistance to permanent deformation of at least one of a Notched Izod impact of at least about 0.5 ft. lb/in and a yield strength of at least about 10,000 psi.

In other aspects, the invention provides an energy absorbing plate useful with a safety-enhanced, prismatic day/night rearview mirror assembly of the type including an anti-scatter layer on the rear surface of a glass mirror element. The plate is positioned between the actuator and the rear surface of the anti-scatter layer. The anti-scatter layer can comprise a hot melt polymeric coating, a plastisol, a tape or other film, preferably having opposed adhesive surfaces, such tape or film including a paper tape or a flexible, resilient, polymeric laminating material having opposed adhesive surfaces such that the energy absorbing plate is adhered to the resilient layer on the back of the mirror element. Materials found suitable for the energy absorbing plate include polymeric plastic materials and metals and preferably, nylon, and glass-filled polybutylene terephthalate, as well as metals such as aluminum, steel, stainless steel, titanium, and alloys of such metals. In the event a metal is used, it is preferred that the plate be electrochemically pacified and non-conductive against galvanic action which could otherwise degrade the reflective layer, typically a high reflector such as silver or aluminum, most preferably silver, on the back of the mirror element. Such pacification is preferably accomplished with a non-conductive paint, ceramic, enamel, lacquer, or the like. Most preferably, a polymeric coating such as epoxy is applied in an electro coating operation such as by a powder coating operation.

In yet other aspects, the energy absorbing plate can be spaced from the rear surface of the mirror element, and can be sized smaller than the mirror element itself such that it is sufficiently large to cover the area intermediate the actuator and the mirror element, such area being typically, and preferably, central to the mirror reflective area.

If polymeric plastic materials are used, it is preferred that the flexural modulus of the plastic material be at least about $1 \times 10^6$ psi while the plate thickness is preferably between 0.02 and 0.125 inch and most preferably between 0.025 and 0.050 inch.

The safety-enhanced, inside rearview mirror assembly of the present invention provides significantly increased safety enhancement for vehicles incorporating supplemental occupant restraint systems including air bags and especially passenger side air bags. The energy absorbing plate used in the invention is uniquely selected to have desired stiffness, resistance to cracking and/or permanent deformation, thickness, and electrochemical pacivity negating any galvanic effects vis-a-vis the reflective layer in the mirror assembly. The energy absorbing plate works well with widely known anti-scatter layers already in use in rearview mirror assemblies to provide a heretofore unknown solution to the often times violent loading on the rearview mirror which accompanies passenger side air bag deployment. However, incorporation of the unique safety enhancement is accomplished without significantly effecting the weight, vibration characteristics, mirror case construction, or long-term durability of the mirror assembly with respect to the quality of light reflected thereby.

These and other objects, advantages, purposes, and features of the invention will become more apparent from a study of the following description taken in conjunction with the drawings.

DESCRIPTION OF THE PREFERRED EMBODIMENTS

Figures 1, 2:
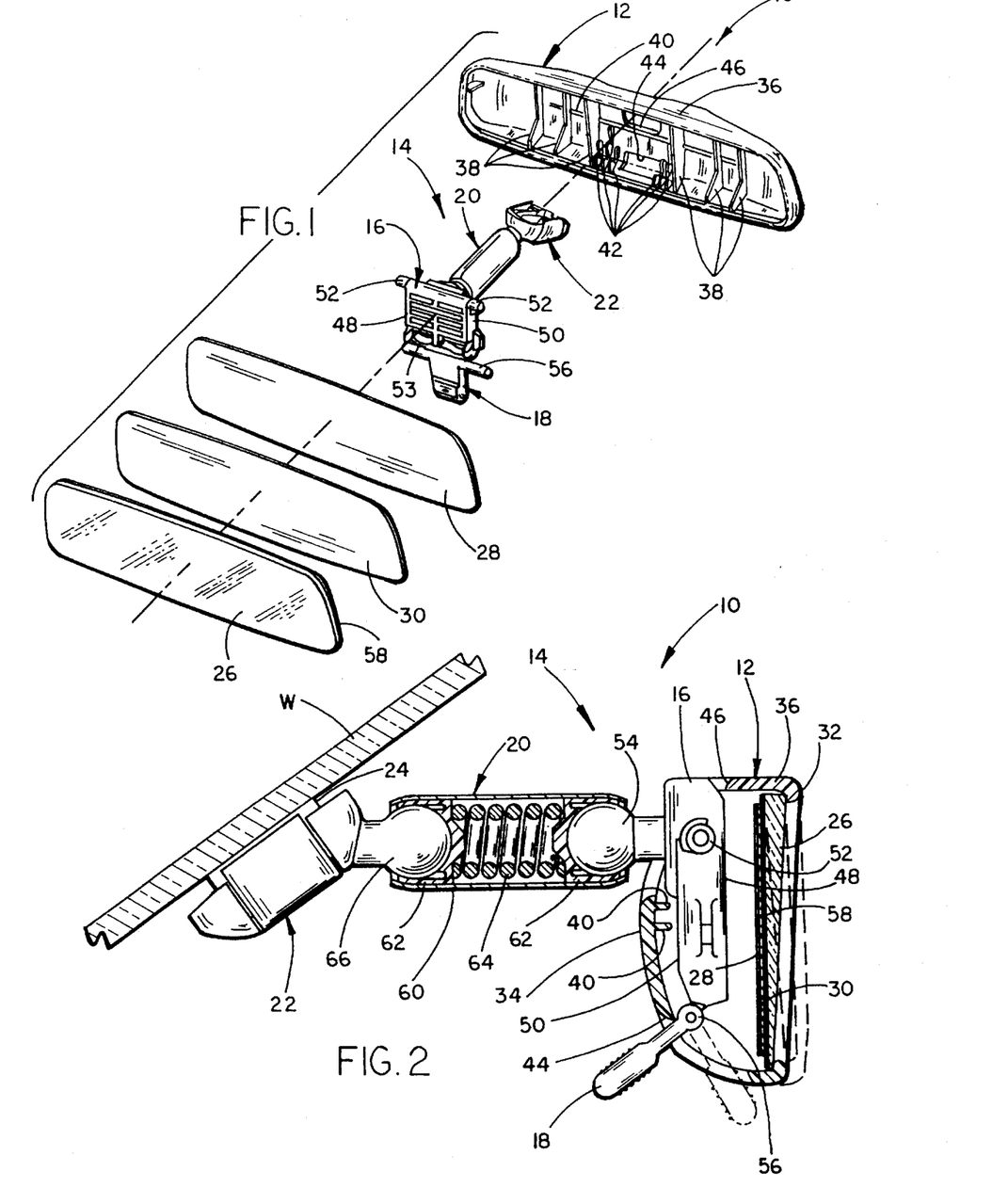
FIG. 1 is an exploded, perspective view of the safety-enhanced, inside, day/night rearview mirror assembly of the present invention incorporating the energy/impact absorbing plate behind the glass mirror element.
FIG. 2 is a side sectional view of the rearview mirror assembly of FIG. 1.

Referring now to the figures in greater detail, FIGS. 1 and 2 illustrate a first preferred form 10 of the safety-enhanced, inside rearview mirror assembly of the present invention. Mirror assembly 10 includes a molded, plastic mirror case 12 formed from polypropylene or another suitable melt-processable, polymeric plastic material, a day/night actuator assembly 14 incorporating a pivotable actuator 16, a toggle lever 18 integrally joined to the bottom edge of actuator 16, a rearview mirror assembly support arm 20 pivotally joined to a ball member on the rear surface of actuator 16, and a breakaway mounting bracket or coupling 22 adapted to be releasably received over a suitably shaped windshield button or base 24 secured to the inside surface of a transparent, glass windshield W as shown in FIG. 2. A transparent glass, prismatic mirror element 26 having energy absorbing plate 28 in accordance with the present invention adhered to its rear surface by an anti-scatter layer 30 is fitted within the mirror element opening defined by rim 32 on the front of the mirror case as shown in FIG. 2.

As seen in FIGS. 1 and 2, mirror case 12 is generally of a hollow construction molded from a thermoplastic material such as polypropylene and having, a back wall 34 spaced behind mirror element 26, a continuous peripheral side wall 36, integral, upstanding support ribs 38 and structural cross members or braces 40 extending between walls 38. A series of actuator shaft support ribs 42 are positioned at the bottom and top of the interior hollow space of the mirror case between the two innermost support ribs 38. Rim 32 extends around the edge of peripheral wall 36 and defines an opening to the hollow interior of the case. That opening is normally positioned to face rearwardly within the vehicle when supported on support arm 20 and bracket assembly 22, as shown in FIG. 2.

The bottom portion of peripheral wall 36 includes a generally rectangular opening 44 providing a space through which the pivot lever 18 of actuator assembly 14 extends when actuator assembly 14 is mounted within the case on supports 42. Similarly, a generally rectangular aperture 46 is provided through the upper portion of the center part of back wall 34 through which support arm 20 is received.

Actuator assembly 14, shown in FIGS. 1 and 2, includes actuator 16 preferably molded from polypropylene or acetal resin including front and back surfaces 48, 50, aligned pivot axles 52, and an integral spring bar 53 allowing compression for over-center pivoting action. A ball member 54 extends outwardly through aperture 46 in mirror case 12 from the upper portion of rear surface 50 and is either integrally molded with actuator 16 or cast from zinc and insert-molded within the actuator. At the lower edge of actuator 16, pivot lever 18 is integrally joined via a living hinge and includes a pivot axle 56 extending parallel to axles 52 adjacent the living hinge. When mounted within the hollow interior of mirror case 12 on supports 42, lever 18 may be grasped and pivoted between the rearward and forward positions shown in solid and phantom lines in FIG. 2 to cause rotation of mirror case 12, including mirror element 26, about the axis provided by pivot axles 52 such that the mirror element 26 will be positioned at different angles to the vehicle operator. The pivot lever causes over-center action of the two-part actuator assembly 14 and the consequent shifting of the mirror case and mirror element. In the rear or day position of lever 18, the reflective, rear surface of prismatic mirror element 26 is aligned with the driver's eyes such that more than 70% of the light incident on the reflective layer is typically reflected to the driver for full daytime vision. However, at night, with headlights impinging on the mirror assembly from the rear, lever 18 may be pivoted forwardly to the position shown in dotted lines in FIG. 2 causing rotation of mirror case 12 and mirror element 26 about axis 52 to the position shown in dotted lines in FIG. 2 such that the front, non-reflective, coated surface of prismatic mirror element 26 is aligned with the driver's eyes to reflect only about 4% of the light incident on that surface to the driver.

Preferably, mirror element 26 is a transparent, solid, prismatic element of glass having non-parallel front and back surfaces. Other mirror elements, such as flat glass, those laminated from two or more pieces of sheet glass, or variable reflectance mirror elements could also be used. In addition, other fracturable materials such as plastic or ceramics could also be used. The rear surface of element 26 preferably includes a thin layer 58 of reflective material such as metallic, silver, chrome, or alloys thereof, preferably covered by a coating of paint for protection, and a resilient, anti-scatter layer 30 designed to retain glass fragments in the event the mirror element is fractured or broken upon impact from the vehicle interior by a vehicle occupant striking the assembly during an accident or the like. Layer 30 may be one of several varieties of materials including adhesively-coated paper tape, a resinous, polyvinylchloride (PVC) applied in plastisol form followed by heat curing, and a hot melt urethane. Preferably, however, the anti-scatter layer 30 is a resilient, flexible laminating adhesive formed from tackified acrylic such as Scotch™ Brand 964 laminating adhesive available from 3M Company of St. Paul, Minn., having a preferred thickness of 0.013 inches. The tackified acrylic Scotch™ Brand 964 laminating adhesive, which has opposed pressure sensitive adhesive surfaces, has excellent long-term adhesive qualities which resist ultraviolet light, chemicals, and high temperatures up to approximately 300° F. (149° C.) and is also resistive to humidity.

Pivotally mounted on ball member 54 to extend toward the windshield from the mirror assembly is mounting arm 20 which includes a swaged metallic, preferably steel tube 60 confining oppositely facing resilient, flexible, polymeric ball cups 62 urged outwardly toward each constricted end by a spring 64. Ball member 54 is confined within one of the ball cups while a ball member 66 extending outwardly from breakaway mounting assembly 22 is confined within the ball cup in the opposite end of the mounting arm. Breakaway assembly 22 is preferably of the type disclosed in copending, commonly assigned, U.S. patent application Ser. No. 08/022,968, filed Feb. 25, 1993, now U.S. Pat. No. 5,377,949 the disclosure of which is hereby incorporated by reference herein. Of course, other coupler or mounting assemblies for securing the mirror assembly to the vehicle could also be used. Accordingly, mounting arm 20 provides a double ball pivot arm providing adjustment at both ends of the arm for positioning the mirror assembly for proper viewing by the vehicle driver.

Figure 6:
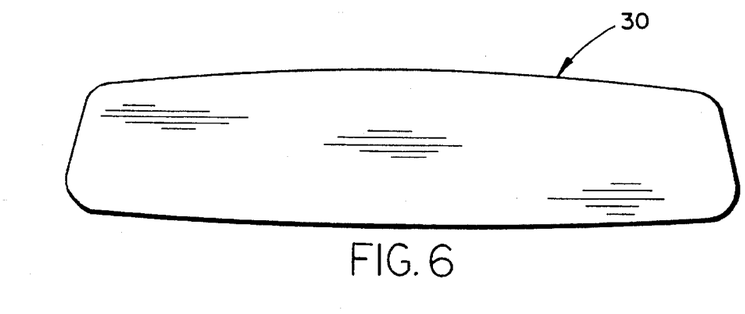
FIG. 6 is a plan view of an adhesive laminate for adhering the energy absorbing plate to the rear surface of the mirror element in the assembly of FIGS. 1 and 2.
Figure 7:
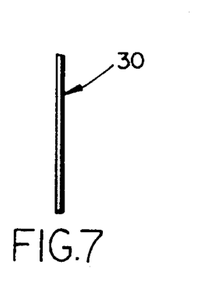
FIG. 7 is a side elevation of the adhesive laminate of FIG. 6.

As shown in FIGS. 6 and 7, anti-scatter layer 30, when formed from a separate material such as the preferred laminating adhesive of the type described above, will be cut and configured to substantially the same shape as the rear surface of the mirror element 26, although preferably slightly smaller than the outer periphery of element 26. As shown in FIG. 6, when the mirror element 26 is generally trapezoidal in shape, the laminating adhesive layer 30 will also be generally trapezoidal in shape but slightly smaller.

As shown in FIGS. 1, 2, 4 and 5, energy absorbing plate 28 is preferably applied directly to the rear surface of laminating adhesive 30 in embodiment 10 of the assembly. Thus, adhesive layer 30 doubles as an anti-scatter layer and a device for maintaining the position of plate 28 between actuator 16 and mirror element 26, while also preventing plate 28 from rattling and vibrating. As with laminating adhesive layer 30, plate 28 is preferably configured to the same general shape as the rear surface of mirror element 26 but is slightly smaller as shown by comparing the outline of plate 28 to the somewhat larger mirror element 26 as outlined in FIG. 4. Plate 28 may be made from either polymeric plastic or metal and is selected to have predetermined properties which provide the proper energy/impact absorbing properties desired for this invention. Preferably, plate 28 will have a minimum stiffness defined by an elastic modulus of at least about 250,000 psi (for metal or plastic), and an ability to bear an impact load without cracking or permanent deformation defined by the Notched Izod impact at room temperature (73° F.) tested under ASTM Standard D256 of at least about 0.5 ft lbs/in (for plastic materials) or a yield strength of at least about 10,000 psi (for metals). For plastics, the elastic modulus is preferably defined as a flexural modulus determined using test standard ASTM D790. In plastic, backing plate 28 can be any of various types including thermoplastic or thermoset, and can be processed by injection molding, compression molding, reaction injection molding, extrusion, or any other suitable molding or forming technique. Suitable plastic materials include nylon, polybutylene terephthalate, glass-filled polybutylene terephthalate, while suitable metals include 6061 T6 aluminum and 2024 T3 aluminum. Preferably, plate 28 has a thickness between 0.020 and 0.125 inches and most preferably between 0.025 and 0.050 inches. For metals, the yield strength is preferably at least about 21,000 psi, and most preferably at least about 32,000 psi.

Figure 4:
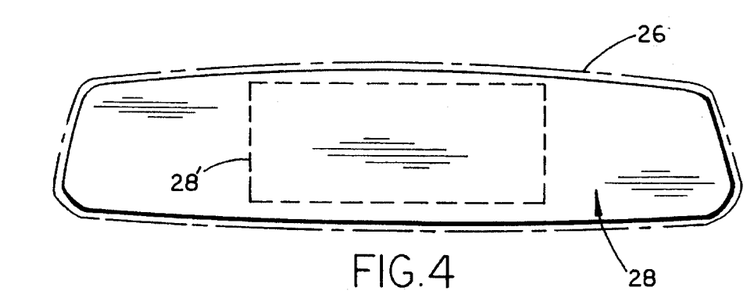
FIG. 4 is a plan view of the energy absorbing plate incorporated in the rearview mirror assemblies of FIGS. 1–3.
Figure 5:
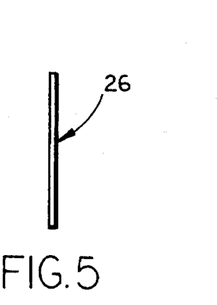
FIG. 5 is a side elevation of the plate of FIG. 4.

As shown in FIG. 4, it is not necessary that plate 28 cover the entire rear surface of the mirror element 26. Rather, it is necessary only that plate 28 be sufficiently large to cover the area intermediate the surface area of actuator surface 48 and the rear surface of mirror element 26 such as is shown by the dotted line 28' in FIG. 4. Typically, that area will be central to the mirror reflective area, as is actuator 16.

It is also preferred that plate 28 be electrochemically pacified to prevent galvanic action with a silver including reflective layer 58 on the rear surface of the mirror element. Such reflective layer 58 is typically applied using a conventional wet chemical silver deposition method involving coating approximately 700 angstroms silver directly onto a glass surface, the silver in turn being over-coated with about 300 angstroms of copper, these metal layers in turn being protected with about 25 microns of a paint, typically a lead-based or low-lead based paint. Without proper pacification, a metallic plate immediately adjacent or in contact with the reflective layer could cause degradation of that layer over time, especially in high humidity or coastal areas where salt is encountered in the atmosphere. Accordingly, plate 26 is made galvanically passive such as by forming the plate from any of the plastic materials noted above or by coating the plate when made from metal with suitable electrically non-conductive coatings prior to adherence to the rear surface of mirror element 26 or mounting within the case. Such coatings can be non-conducting paint, lacquer, ceramic, enamel, or the like. In the preferred embodiment, when one of the preferred aluminum plates is used for plate 28, the plate is entirely coated with a coating of epoxy, preferably in accordance with the engineering material specification ESB-M64J19-A1 available from Ford Motor Company, Dearborn, Mich., and preferably applied in an electro coating operation. Alternately, other metals could be used such as steel, stainless steel, titanium or various alloys thereof, all of which are preferably passified as described above.

Figure 3:
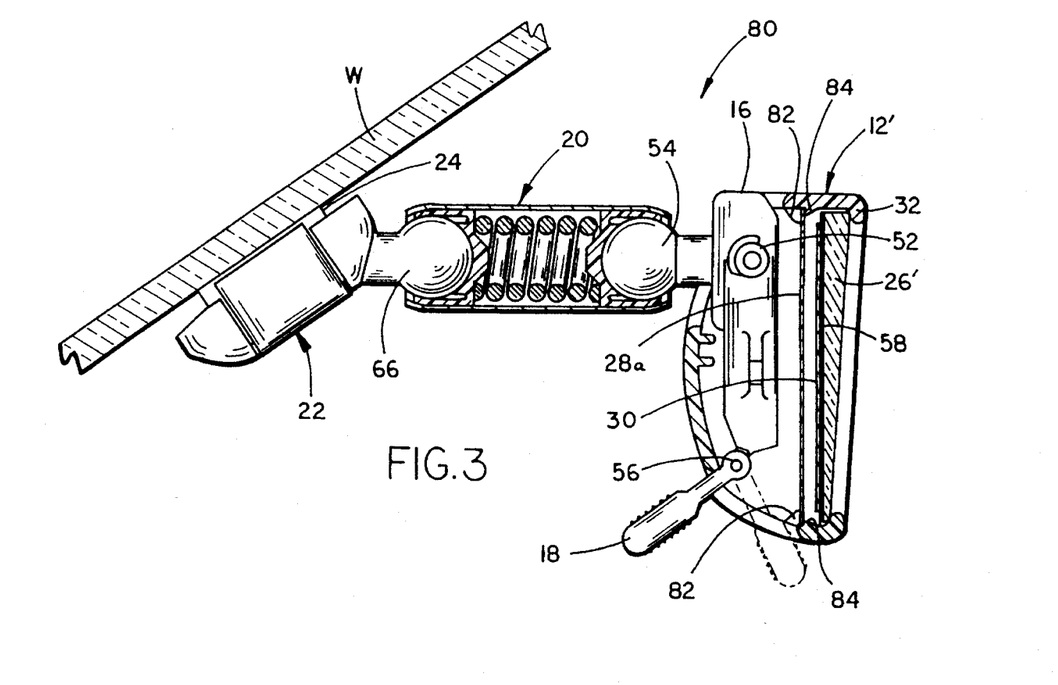
FIG. 3 is a side sectional view of an alternative embodiment of the safety-enhanced rearview mirror assembly of the present invention.

With reference to FIG. 3, a second embodiment 80 of the inside, day/night safety-enhanced, rearview mirror assembly of the present invention is shown wherein like numerals indicate like parts to those in embodiment 10. The principal difference between embodiment 80 and embodiment 10 is the inclusion of energy/impact absorbing plate 28a which is selected to have the same stiffness, resistance to cracking and/or permanent deformation, thickness and galvanic pacivity as plate 28 but is mounted within mirror case 12' at a position spaced behind the rear, anti-scatter coated surface of mirror element 26' by a distance within the range of between about 0.010 to 1.25 inches. In mirror case 12, plate 28a is secured between upper and lower support ribs 82, 84 so as to be held securely to avoid vibration and rattling from road shocks or other movements of the vehicle. Mirror element 26' includes the same paint-coated reflective layer 58 and anti-scatter coating 30 as used in embodiment 10 except that plate 28a is not adhered to that anti-scatter layer as described above.

In either version 10 or 80, in the event of an impact caused by deployment of an air bag within the vehicle passenger compartment causing sudden, violent impact of the mirror assembly toward the windshield setting up a column loading situation against the actuator 16, ball 54, mounting arm 20 and mounting bracket 22, as shown in FIGS. 2 or 3, the energy of the impact between the front surface of actuator 16 and mirror element 26 or 26' will be absorbed by plate 28 or 28a sufficiently to substantially reduce damaging protrusion of glass pieces or shards beyond the thickness of rim 32 of mirror case 12 or 12'. As a result, puncturing or other damage to the expanded air bag is substantially prevented, especially if accentuated by the addition of an impact from a vehicle occupant against the passenger compartment surface of the air bag which increases such column loading. In addition, the inclusion of plate 28 or 28a has little or no effect on the overall weight, vibration, or required shape or construction of the mirror case, all without causing degradation of the light reflective layer.

As set forth below, testing of the invention substantially as shown in FIGS. 1 and 2 reveals the safety-enhanced, energy-absorbing operation of the present inventive rearview mirror assembly. Initially, a rearview mirror assembly in accordance with that shown in FIGS. 1 and 2 but without the inclusion of any energy absorbing plate 28 on or spaced behind the rear surface of the mirror element was tested using the following procedure. The mirror assembly was mounted on a slanted plate having a windshield mounting button mounted thereon in like manner to the support of such a mirror assembly on a windshield. Thereafter, a pendulum mounted above the mirror assembly and having a radius of 39.4 inches and carrying a rectangular weight of 30 pounds having the dimensions of 8 by 14 inches and covered with a 2 inch thick foam pad was released from a 60° angle and swung into the front surface of the mirror element in the mirror assembly. Such action simulates the impact received from the deployment of a passenger side air bag which strikes the full front face of the mirror assembly upon expansion forcing the assembly toward the windshield and against the day/night actuator in a column loading situation as described above. The glass mirror element had a maximum thickness of about 0.21 inches tapering to a minimum thickness of about 0.065 inches and a layer of a melt-processable, R101 hot melt compound of about 0.01 inches available from Donnelly Corporation of Holland, Mich. roller coated on the rear surface of the mirror element prior to assembly. The test resulted in fracture of the mirror element with glass pieces and shards protruding outwardly of the mirror case beyond rim 32 in a jagged, uneven manner fully capable to puncture and damage any expanded air bag which might come in contact therewith.

Various samples of the present invention including the energy/impact absorbing plate 28 were also tested as follows:

EXAMPLE 1

A rearview mirror assembly substantially as shown in FIGS. 1 and 2 was impact tested with the pendulum test procedure set forth above. A glass, prismatic mirror element having a maximum thickness of about 0.21 inches tapering to a minimum thickness of about 0.065 inches included a paint coated reflective layer and a 0.013 inch thick layer of 3M Scotch™ Brand 964 laminating adhesive anti-scatter layer on its rear surface, to which was adhered a 0.042 inch thick plate of TENITE P6M4Z-007 impact copolymer, polypropylene having a flexural modulus of 126,000 psi and a Notched Izod impact of 2.8 ft lbs/in is available from Eastman Chemical Products, Inc. of Kingsport, Tenn. The test fractured the glass mirror element and glass pieces and shards protruded beyond the front rim 32 sufficient to potentially puncture and/or damage an expanded air bag in contact therewith and was, thus, considered unacceptable.

EXAMPLE 2

A rearview mirror assembly substantially as shown in FIGS. 1 and 2 and including a glass prismatic mirror element, reflective layer and laminating adhesive anti-scatter layer on the rear surface thereof as described above in Example 1 was tested using the pendulum test procedure described above. Included was a nylon energy absorbing plate having a thickness of 0.042 inches and formed from PA123G13BK-47 nylon available from Bay Resins, Inc. of Millington, Md., and having a flexural modulus of 550,000 psi and a Notched Izod impact of 1.68 ft lbs/in. The test resulted in fracture of the glass mirror element although glass pieces and shards did not protrude beyond the plane of the outer surface of rim 32 of the mirror case 12 after the test.

EXAMPLE 3

A rearview mirror assembly substantially as shown in FIGS. 1 and 2 was tested using the above pendulum test procedure and included a prismatic glass mirror element, reflective layer and laminating adhesive anti-scatter layer on the rear surface thereof as described above in connection with Example 1. Included was an energy absorbing plate formed by injection molding of Valox 420 30% glass-filled polybutylene terephthalate and having a thickness of 0.042 inches and available from GE Plastics of Pittsfield, Mass. The plate had a flexural modulus of $1.1 \times 10^6$ psi and a Notched Izod impact of 1.6 ft lbs/in. Although the glass mirror element fractured, pieces and shards did not protrude beyond the rim 32.

EXAMPLE 4

A rearview mirror assembly substantially as shown in FIGS. 1 and 2 and including a prismatic glass mirror element, reflective layer and laminating adhesive anti-scatter layer on the rear surface thereof as described above in connection with Example 1 was tested using the above pendulum test procedure. Included was an energy absorbing plate formed from G10 Micarta™ glass epoxy laminate available from Westinghouse Electric Corporation of Hampton, S.C., and having a thickness of 0.042 inches, a flexural modulus of $2.5 \times 10^6$ psi and a Notched Izod impact of 12 ft lbs/in. Although the glass mirror element fractured, no pieces or shards protruded beyond the front rim 32 after the test.

EXAMPLE 5

A rearview mirror assembly substantially as shown in FIGS. 1 and 2 and including a prismatic glass mirror element, reflective layer and laminating adhesive anti-scatter layer as described above in Example 1 was tested using the above pendulum test method. Included was a supplemental glass plate adhered to the rear surface of the laminating adhesive and having a thickness of 0.043 inches, a flexural modulus of $10 \times 10^6$ psi and an impact strength categorized as brittle (significantly less than 0.5 ft lbs/in). The test resulted in a fractured glass mirror element with pieces and shards protruding well beyond the front rim of the mirror assembly.

EXAMPLE 6

A rearview mirror assembly substantially as shown in FIGS. 1 and 2 and including a prismatic glass mirror element, reflective layer and laminating adhesive anti-scatter layer on the rear surface thereof as described in Example 1 was tested using the above pendulum test method. Included was a metal energy absorbing plate formed from 5052 H32 aluminum having a thickness of 0.032 inches, a flexural modulus of $10 \times 10^6$ psi and a yield strength of 28,000 psi. The test results provided a fractured glass mirror element having some fragments protruding beyond the front rim 32 of the mirror case, although to a much less extent than without any energy absorbing plate or only with an anti-scatter layer on the back of the glass mirror element.

EXAMPLE 7

A rearview mirror assembly substantially as shown in FIGS. 1 and 2 and including a glass prismatic mirror element, reflective layer and a laminating adhesive anti-scatter layer as set forth in Example 1 was tested using the above pendulum test method and included a metal energy absorbing plate adhered to the laminating adhesive formed from 6061 T6 aluminum having a thickness of 0.032 inches, an elastic modulus of $10 \times 10^6$ psi and a yield strength of about 40,000 psi. The test results showed a fractured glass mirror element without pieces or shards protruding beyond the front rim 32 of the mirror assembly.

EXAMPLE 8

A safety-enhanced rearview mirror assembly substantially as shown in FIGS. 1 and 2 including a prismatic glass mirror element, reflective layer and laminating adhesive anti-scatter layer as set forth in Example 1 was tested using the above pendulum test method. Included was a metal energy absorbing plate formed from 2024 T3 aluminum having a thickness of 0.032 inches, an elastic modulus of $10 \times 10^6$ psi and a yield strength of about 50,000 psi. The test results showed a fractured glass mirror element without glass pieces or shards protruding beyond the front rim 32 of the mirror assembly.

In addition, testing was also done of the various energy absorbing plates described above in Examples 1–8 but using the R101 hot melt as anti-scatter layer 30 on the rear surface of the mirror element. In this case, plate 28 was applied to the hot melt. Those tests produced substantially the same results as set forth above in Examples 1–8.

In the addition to the above materials, the following moldable materials are also suitable for use in the energy absorbing plates 28, 28*a* of the present invention:

| Material/Supplier | Polymer | Filler % | Flexural Modulus (psi × 10⁶) | Notched Izod Impact (Ft-lb/in) |
|---|---|---|---|---|
| Celstran N66G60 Hoechst Celanese [Winona, MN] | Nylon 6,6 | Long Glass Fiber 60% | 2.58 | 11 |
| Reny N-252 Mitsubishi Gas Chemical [New York, NY] | Nylon MXD6 | Glass Fiber 40% Mineral 20% | 2.9 | 1.5 |
| Rynite 55 DuPont [Wilmington, DE] | Polyethylene Terephthalate | Glass Fiber 55% | 2.26 | 2 |
| Isoplast 101LGF60 Dow Chemical [Midland, MI] | Therinoplastic Urethane | Long Glass Fiber 60% | 2.2 | 15 |
| Celstran PET G50-03-4 Hoechst Celanese [Winona, MN] | Polyethylene Terephthalate | Long Glass Fiber 50% | 2.54 | 5.5 |
| Tedur KU1-7523 Albis Corp. [Rosenberg, TX] | Polyphenylene sulfide | Glass Fiber 60% | 3.31 | 1.1 |

-continued

| Material/Supplier | Polymer | Filler % | Flexural Modulus (psi × 10$^6$) | Notched Izod Impact (Ft-lb/in) |
|---|---|---|---|---|
| RX-865 Rogers Corp. [Manchester, CT] | Phenolic (Thermoset) | Glass Fiber 60% | 2.9 | 1.5 |
| BMC200 BMC Inc. [St. Charles, IL] | Polyester (Thermoset) | Long Fiber Glass 40% | 2.5 | 3-6 |

It will be understood that the present invention is useful with other inside, day/night rearview mirror assemblies utilizing actuator assemblies different than that shown in FIGS. 1-3 of the present invention. Also, although a pivotal day/night actuator mechanism is shown, other rearview mirror partial reflectance state selection mechanisms and variable reflectance mirror elements could also be used. Similarly, the present invention is useful with mirror cases other than that shown in FIGS. 1-3 above.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. An energy absorbing, prismatic rearview mirror assembly for use on the interior of a vehicle of the type equipped with an air bag/supplemental occupant restraint system, said assembly comprising:
   a mirror case having a peripheral rim defining an opening in said case;
   a prismatic, glass mirror element mounted within said mirror case, said mirror element having a front surface adjacent said rim and a rear surface facing the interior of said mirror case;
   a light reflective layer on said rear surface of said mirror element;
   a day/night actuator mounted within said mirror case adjacent said rear surface of said mirror element, said actuator being movable to move said mirror element between a day position in which light is reflected from said reflective layer to a viewer and a night position in which a reduced amount of light is reflected from said front surface of said mirror element to a viewer;
   a support arm mounted on said actuator to support said assembly on the vehicle;
   an anti-scatter layer on said rear surface of said mirror element; and
   an energy absorbing plate for protecting said mirror element in the event of contact by said actuator caused by deployment of an air bag within the vehicle, said plate being located within said mirror case at a position to the rear of said rear surface of said mirror element and between said actuator and said rear surface of said anti-scatter layer, said actuator and support arm being spaced to the rear of said plate, said plate selected to have a sufficient thickness, stiffness and resistance to cracking and permanent deformation to absorb/disperse energy in the event an impact from the direction of said front surface of said mirror element by a deployed air bag within the vehicle causes fracture of said mirror element by said actuator when said assembly is mounted in a vehicle, 2. The mirror assembly of claim 1 wherein said plate is adhered to said anti-scatter layer on said mirror element.

3. The mirror assembly of claim 2 wherein said plate is adhered by a layer of material having opposed adhesive surfaces.

4. The mirror assembly of claim 3 wherein said adhering layer is a tackified acrylic laminating adhesive.

5. The mirror assembly of claim 2 wherein said plate is made of polymeric plastics or metals.

6. An energy absorbing, prismatic rearview mirror assembly for use on the interior of a vehicle of the type equipped with an air bag/supplemental occupant restraint system, said assembly comprising:
   a mirror case having a peripheral rim defining an opening in said case;
   a prismatic, glass mirror element mounted within said mirror case, said mirror element having a front surface adjacent said rim and a rear surface facing the interior of said mirror case;
   a light reflective layer on said rear surface of said mirror element;
   a day/night actuator mounted within said mirror case adjacent said rear surface of said mirror element, said actuator being movable to move said mirror element between a day position in which light is reflected from said reflective layer to a viewer and a night position in which a reduced amount of light is reflected from said front surface of said mirror element to a viewer;
   a support arm mounted on said actuator to support said assembly on the vehicle;
   an anti-scatter layer on said rear surface of said mirror element; and
   an energy absorbing plate for protecting said mirror element in the event of contact by said actuator caused by deployment of an air bag within the vehicle, said plate being located within said mirror case between said actuator and said rear surface of said anti-scatter layer, said plate selected to have a sufficient thickness, stiffness and resistance to cracking and permanent deformation to absorb/disperse energy in the event an impact from the direction of said front surface of said mirror element by a deployed air bag within the vehicle causes fracture of said mirror element by said actuator when said assembly is mounted in a vehicle;
   said plate being adhered to said anti-scatter layer on said mirror element, and being made of polymeric plastics or metals;
   said said polymeric plastic or metals consist of nylon, glass-filled polybutylene terephthalate, aluminum, steel, stainless steel, titanium, or metal alloys.

7. An energy absorbing, prismatic rearview mirror assembly for use on the interior of a vehicle of the type equipped with an air bag/supplemental occupant restraint system, said assembly comprising:

a mirror case having a peripheral rim defining an opening in said case;

a prismatic, glass mirror element mounted within said mirror case, said mirror element having a front surface adjacent said rim and a rear surface facing the interior of said mirror case;

a light reflective layer on said rear surface of said mirror element;

a day/night actuator mounted within said mirror case adjacent said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle;

an anti-scatter layer on said rear surface of said mirror element; and an energy absorbing plate for protecting said mirror element in the event of contact by said actuator caused by deployment of an air bag within the vehicle, said plate being located within said mirror case between said actuator and said rear surface of said anti-scatter layer, said plate selected to have a sufficient thickness, stiffness and resistance to cracking and permanent deformation to absorb/disperse energy in the event an impact from the direction of said front surface of said mirror element by a deployed air bag within the vehicle causes fracture of said mirror element by said actuator when said assembly is mounted in a vehicle;

said plate being adhered to said anti-scatter layer on said mirror element, and being selected from the group of materials consisting of polymeric plastics and metals;

said plate being metal and including a pacifying, non-conductive coating thereon.

8. The mirror assembly of claim 7 wherein said plate is aluminum having an epoxy coating thereon.

9. The mirror assembly of claim 2 wherein said plate is metal having a pacifying, non-conductive coating thereon.

10. The mirror assembly of claim 1 wherein said rear surface of said mirror element has a predetermined peripheral configuration, said plate having a configuration smaller than said predetermined peripheral configuration.

11. The mirror assembly of claim 1 wherein said plate is smaller than said mirror element and is sufficiently large to cover the area intermediate said actuator and said mirror element.

12. An energy absorbing, prismatic rearview mirror assembly for use on the interior of a vehicle of the type equipped with an air bag/supplemental occupant restraint system, said assembly comprising:

a mirror case having a peripheral rim defining an opening in said case;

a prismatic, glass mirror element mounted within said mirror case, said mirror element having a front surface adjacent said rim and a rear surface facing, the interior of said mirror case;

a light reflective layer on said rear surface of said mirror element;

a day/night actuator mounted within said mirror case adjacent said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle;

an anti-scatter layer on said rear surface of said mirror element; and an energy absorbing plate for protecting said mirror element in the event of contact by said actuator caused by deployment of an air bag within the vehicle, said plate being located within said mirror case between said actuator and said rear surface of anti-scatter layer, said plate selected to have a sufficient thickness, stiffness and resistance to cracking and permanent deformation to absorb/disperse energy in the event an impact from the direction of said front surface of said mirror element by a deployed air bag within the vehicle causes fracture of said mirror element by said actuator when said assembly is mounted in a vehicle;

said plate being mounted within said mirror case and spaced rearwardly of said rear surface of said mirror element.

13. An energy absorbing, prismatic rearview mirror assembly for use on the interior of a vehicle of the type equipped with an air bag/supplemental occupant restraint system, said assembly comprising:

a mirror case having a peripheral rim defining an opening in said case;

a prismatic, glass mirror element mounted within said mirror case, said mirror element having a front surface adjacent said rim and a rear surface facing the interior of said mirror case;

a light reflective layer on said rear surface of said mirror element:

a day/night actuator mounted within said mirror case adjacent said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle;

an anti-scatter layer on said rear surface of said mirror element; and an energy absorbing plate for protecting said mirror element in the event of contact by said actuator caused by deployment of an air bag within the vehicle, said plate being located within said mirror case between said actuator and said rear surface of said anti-scatter layer, said plate selected to have a sufficient thickness, stiffness and resistance to cracking and permanent deformation to absorb/disperse energy in the event an impact from the direction of said front surface of said mirror element by a deployed air bag within the vehicle causes fracture of said mirror element by said actuator when said assembly is mounted in a vehicle;

said anti-scatter layer being selected from the group consisting essentially of a hot-melt polymeric coating, a plastisol, a tape, a film, a tape having opposed adhesive surfaces, a film having opposed adhesive surfaces, and a flexible, resilient polymeric material having opposed adhesive surfaces.

14. The mirror assembly of claim 1 wherein said mirror case is molded from a polymeric material and includes a peripheral wall having said rim thereon, and a rear wall spaced behind said rim to define a hollow interior within said case;

said actuator being pivotally mounted within said hollow interior adjacent to said plate.

15. An energy absorbing, prismatic rearview mirror assembly for use on the interior of a vehicle of the type equipped with an air bag/supplemental occupant restraint system, said assembly comprising:

a mirror case having a peripheral rim defining an opening in said case;

a prismatic, glass mirror element mounted within said mirror case, said mirror element having a front surface adjacent said rim and a rear surface facing the interior of said mirror case;

a light reflective layer on said rear surface of said mirror element;

a day/night actuator mounted within said mirror case adjacent said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle;

an anti-scatter layer on said rear surface of said mirror element; and an energy absorbing plate for protecting said mirror element in the event of contact by said actuator caused by deployment of an air bag within the vehicle, said plate being located within said mirror case between said actuator and said rear surface of said anti-scatter layer, said plate selected to have a sufficient thickness, stiffness and resistance to cracking and permanent deformation to absorb/disperse energy in the event an impact from the direction of said front surface of said mirror element by a deployed air bag within the vehicle causes fracture of said mirror element by said actuator when said assembly is mounted in a vehicle;

said plate being selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi.

16. The mirror assembly of claim 15 wherein said resistance to cracking and permanent deformation of said plate is a Notched Izod impact of at least about 1.0 ft lb/in.

17. The mirror assembly of claim 15 wherein said resistance to cracking and permanent deformation of said plate is a yield strength of at least about 21,000 psi.

18. The mirror assembly of claim 17 wherein said yield strength is at least about 32,000 psi.

19. The mirror assembly of claim 15 wherein said plate thickness is within the range of between about 0.020 and 0.125 inches.

20. The mirror assembly of claim 19 wherein said plate thickness is within the range of between about 0.025 and 0.050 inches.

21. The mirror assembly of claim 20 wherein said elastic modulus of said plate is at least $1 \times 10^6$ psi.

22. The mirror assembly of claim 15 wherein said elastic modulus of said plate is at least $1 \times 10^6$ psi.

23. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle;

an energy absorbing plate for protecting said mirror element in the event of contact by said actuator caused by deployment of an air bag within the vehicle, said plate being located within said mirror case at a position to the rear of said rear surface of said mirror element and between said actuator and said rear surface of said mirror element, said actuator and support arm being spaced to the rear of said plate, said plate selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi.

24. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle;

an energy absorbing plate for protecting said mirror element in the event of contact by said actuator caused by deployment of an air bag within the vehicle, said plate being located within said mirror case between said actuator and said rear surface of said mirror element, said plate selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi;

said plate being adhered to said mirror element rear surface over said reflective layer.

25. The mirror assembly of claim 24 wherein said plate is adhered by a layer of material having opposed adhesive surfaces.

26. The mirror assembly of claim 25 wherein said mirror element is glass; said adhering layer being a tackified acrylic laminating adhesive.

27. The mirror assembly of claim 24 wherein said plate is made of polymeric plastics or metals.

28. The mirror assembly of claim 27 wherein said polymeric plastic or metals consist of nylon, glass-filled polybutylene terephthalate, aluminum, steel, stainless steel, titanium, or alloys thereof.

29. The mirror assembly of claim 27 wherein said plate is aluminum having an epoxy coating thereon.

30. The mirror assembly of claim 27 wherein said plate is metal having a pacifying, non-conductive coating thereon.

31. The mirror assembly of claim 24 wherein said rear surface of said mirror element has a predetermined peripheral configuration, said plate having a configuration smaller than said predetermined peripheral configuration.

32. An energy absorbing, inside rearview mirror assembly for use on a vehicle equipped with an air bag/supplemental occupant restraint system, said assembly comprising:
  a mirror case;
  a mirror element mounted within said case, being of the type which is fracturable upon impact, and having front and rear surfaces, said rear surface facing the interior of said mirror case;
  a light reflective layer on said rear surface of said mirror element;
  a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;
  a support arm mounted on said actuator to support said assembly on the vehicle;
  an energy absorbing plate for protecting said mirror element in the event of contact by said actuator caused by deployment of an air bag within the vehicle, said plate being located within said mirror case between said actuator and said rear surface of said mirror element, said plate selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi;
  said plate being mounted within said mirror case and spaced rearwardly of said rear surface of said mirror element.

33. An energy absorbing, inside rearview mirror assembly for use on a vehicle equipped with an air bag/supplemental occupant restraint system, said assembly comprising:
  a mirror case;
  a mirror element mounted within said case, being of the type which is fracturable upon impact, and having front and rear surface, said rear surface facing the interior of said mirror case;
  a light reflective layer on said rear surface of said mirror element;
  a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;
  a support arm mounted on said actuator to support said assembly on the vehicle;
  an energy absorbing plate for protecting said mirror element in the event of contact by said actuator caused by deployment of an air bag within the vehicle, said plate being located within said mirror case between said actuator and said rear surface of said mirror element, said plate selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi, and
  an anti-scatter layer on said rear surface of said mirror element between said plate and said reflective layer.

34. The mirror assembly of claim 33 wherein said mirror element is glass; said anti-scatter layer being selected from the group consisting essentially of a hot-melt polymeric coating, a plastisol, a tape, a film, a tape having opposed adhesive surfaces, a film having opposed adhesive surfaces, and a flexible, resilient polymeric material having opposed adhesive surfaces.

35. An energy absorbing, inside rearview mirror assembly for use on a vehicle equipped with an air bag/supplemental occupant restraint system, said assembly comprising:
  a mirror case;
  a mirror element mounted within said case, being of the type which is fracturable upon impact, and having front and rear surfaces, said rear surface facing the interior of said mirror case;
  a light reflective layer on said rear surface of said mirror element;
  a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;
  a support arm mounted on said actuator to support said assembly on the vehicle:
  an energy absorbing plate for protecting said mirror element in the event of contact by said actuator caused by deployment of an air bag within the vehicle, said plate being located within said mirror case between said actuator and said rear surface of said mirror element, said plate selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi;
  said plate being smaller than said mirror element and sufficiently large to cover the area intermediate said actuator and said mirror element.

36. An energy absorbing, inside rearview mirror assembly for use on a vehicle equipped with an air bag/supplemental occupant restraint system, said assembly comprising:
  a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle;

an energy absorbing plate for protecting said mirror element in the event of contact by said actuator caused by deployment of an air bag within the vehicle, said plate being located within said mirror case between said actuator and said rear surface of said mirror element, said plate selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi;

said plate thickness being within the range of between about 0.020 and 0.125 inches.

37. The mirror assembly of claim 36 wherein said plate thickness is within the range of between about 0.025 and 0.050 inches.

38. The mirror assembly of claim 37 wherein said elastic modulus of said plate is at least $1\times10^6$ psi.

39. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support and mounted on said actuator to support said assembly on the vehicle;

an energy absorbing plate for protecting said mirror element in the event of contact by said actuator caused by deployment of an air bag within the vehicle, said plate being located within said mirror case between said actuator and said rear surface of said mirror element, said plate selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi, said elastic modulus of said plate being at least $1\times10^6$ psi.

40. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle;

an energy absorbing plate for protecting said mirror element in the event of contact by said actuator caused by deployment of an air bag within the vehicle, said plate being located within said mirror case between said actuator and said rear surface of said mirror element, said plate selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi, said resistance to cracking and permanent deformation of said plate being a Notched Izod impact of at least about 1.0 ft lb/in.

41. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle;

an energy absorbing plate for protecting said mirror element in the event of contact by said actuator caused by deployment of an air bag within the vehicle, said plate being located within said mirror case between said actuator and said rear surface of said mirror element, said plate selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi, said resistance to cracking and permanent deformation of said plate being a yield strength of at least about 21,000 psi.

42. The mirror assembly of claim 41 wherein said yield strength is at least about 32,000 psi.

43. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle;

an energy absorbing plate for protecting said mirror element in the event of contact by said actuator caused by deployment of an air bag within the vehicle, said plate being located within said mirror case between said actuator and said rear surface of said mirror element, said plate selected to have a thickness within the range of between about 0.015 and 0.250 inches, an elastic modulus of at least about 250,000 psi, and a resistance to cracking and permanent deformation of at least one of a Notched Izod impact of at least about 0.5 ft lb/in and a yield strength of at least about 10,000 psi;

said mirror case being molded from a polymeric material and including a peripheral wall having a rim defining an opening in said case, and a rear wall spaced behind said rim to define a hollow interior within said case;

said actuator being pivotally mounted within said hollow interior adjacent to and spaced to the rear of said plate to move said mirror case and mirror element between said day and night positions; said mirror element being glass.

44. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle; and an energy absorbing plate for protecting said mirror element in the event of contact by said actuator caused by deployment of an air bag within the vehicle, said plate being located within said mirror case at a position to the rear of said rear surface of said mirror element and between said actuator and said rear surface of said mirror element, said actuator and support arm being spaced to the rear of said plate, said plate being formed from a polymeric material having a flexural modulus of at least about 250,000 psi, a Notched Izod impact of at least about 0.5 ft lb/in, and a thickness within the range of between about 0.015 and 0.250 inches.

45. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle; and an energy absorbing plate for protecting said mirror element in the event of contact by said actuator caused by deployment of an air bag within the vehicle, said plate being located within said mirror case between said actuator and said rear surface of said mirror element, said plate being formed from a polymeric material having a flexural modulus of at least about 250,000 psi, a Notched Izod impact of at least about 0.5 ft lb/in, and a thickness within the range of between about 0.015 and 0.250 inches, said plate being adhered to said mirror element rear surface over said reflective layer, said mirror element being glass.

46. The mirror assembly of claim 45 wherein said plate is adhered by a layer of material having opposed adhesive surfaces.

47. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle; and an energy absorbing plate for protecting said mirror element in the event of contact by said actuator caused by deployment of an air bag within the vehicle, said plate being located within said mirror case between said actuator and said rear surface of said mirror element, said plate being formed from a polymeric material having a flexural modulus of at least about 250,000 psi, a Notched Izod impact of at least about 0.5 ft lb/in, and a thickness within the range of between about 0.015 and 0.250 inches; and an anti-scatter layer on said rear surface of said mirror element between said plate and said reflective layer, said mirror element being glass.

48. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case:

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer:

a support arm mounted on said actuator to support said assembly on the vehicle; and an energy absorbing plate for protecting said mirror element in the event of contact by said actuator caused by deployment of an air bag within the vehicle, said plate being located within said mirror case between said actuator and said rear surface of said mirror element, said plate being formed from a polymeric material having a flexural modulus of at least about 250,000 psi, a Notched Izod impact of at least about 0.5 ft lb/in, and a thickness within the range of between about 0.015 and 0.250 inches, said plate being glass-filled polybutylene terephthalate having a thickness of between about 0.025 and 0.050 inches and a flexural modulus of at least about $1 \times 10^6$ psi.

49. An energy absorbing, inside rearview mirror assembly for use on a vehicle equipped with an air bag/supplemental occupant restraint system, said assembly comprising:

a mirror case;

a mirror element mounted within said case, being of the type which is fracturable upon impact, and having front and rear surfaces, said rear surface facing the interior of said mirror case;

a light reflective layer on said rear surface of said mirror element;

a day/night actuator mounted for movement in said mirror case behind said rear surface of said mirror element, said actuator being movable to move said mirror element between a day position in which light is reflected from said reflective layer to a viewer and a night position in which a reduced amount of light is reflected from said front surface of said mirror element to a viewer;

a support arm mounted on said actuator to support said assembly on the vehicle; and an energy absorbing plate for protecting said mirror element in the event of contact by said actuator caused by deployment of an air bag within the vehicle, said plate being located within said mirror case between said actuator and said rear surface of said mirror element, said plate being formed from a polymeric material having a flexural modulus of at least about 250,000 psi, a Notched Izod impact of at least about 0.5 ft lb/in, and a thickness within the range of between about 0.015 and 0.250 inches;

said plate being mounted within said mirror case and spaced rearwardly of said rear surface of said mirror element.

* * * * *

UNITED STATES PATENT AND TRADEMARK OFFICE
CERTIFICATE OF CORRECTION

PATENT NO. : 5,521,760
DATED : May 28, 1996
INVENTOR(S) : Harold W. DeYoung, et. al.

It is certified that error appears in the above-indentified patent and that said Letters Patent is hereby corrected as shown below:

Column 1, line 48:
  After "deployed" delete "."
Column 2, line 3:
  "toward tile" should be --toward the--
Column 10, line 12 of table, under column "Polymer":
  "Therinoplastic" should be --Thermoplastic--
Column 12, line 13:
  "vehicle," should be --vehicle.--
Column 12, line 62:
  Delete "said" (second occurrence); and
  "plastic" should be --plastics--
Column 14, line 13:
  After "of" insert --said--
Column 17, line 7:
  "plastic" should be --plastics--; and
  "consist" should be --consisting--
Column 17, line 59:
  "surface" (first occurrence) should be --surfaces--
Column 19, line 54:
  "and" should be --arm--

Signed and Sealed this

Third Day of June, 1997

BRUCE LEHMAN

*Attest:*

*Attesting Officer*    *Commissioner of Patents and Trademarks*